United States Patent
Sakura et al.

(10) Patent No.: US 7,304,594 B2
(45) Date of Patent: Dec. 4, 2007

(54) TRANSMITTING AND RECEIVING DEVICE AND TRANSMITTING DEVICE AND RECEIVING DEVICE

(75) Inventors: Shigeyuki Sakura, Kawasaki (JP); Hiroshi Suzunaga, Kawasaki (JP); Masaru Numano, Kawaguchi (JP); Atsushi Iwata, Higashi-Hiroshima (JP); Yoshitaka Murasaka, Higashi-Hiroshima (JP); Toshifumi Imamura, Higashi-Hiroshima (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/536,251

(22) Filed: Sep. 28, 2006

(65) Prior Publication Data
US 2007/0075886 A1    Apr. 5, 2007

(30) Foreign Application Priority Data
Sep. 30, 2005   (JP) ............................. 2005-288735

(51) Int. Cl.
*H03M 3/00* (2006.01)
(52) U.S. Cl. ........................... 341/143; 341/110; 381/2
(58) Field of Classification Search ......... 341/110–143
See application file for complete search history.

(56) References Cited
U.S. PATENT DOCUMENTS 5,287,107 A   2/1994  Gampell et al.
5,844,513 A   12/1998 Nishio
7,075,280 B2 * 7/2006 May ........................... 323/284

FOREIGN PATENT DOCUMENTS

| JP | 8-279786   | 10/1996 |
| JP | 8-331064   | 12/1996 |
| JP | 11-55353   | 2/1999  |
| JP | 2005-294758 | 10/2005 |
| JP | 2005-311847 | 11/2005 |

* cited by examiner

*Primary Examiner*—Lam T. Mai
(74) *Attorney, Agent, or Firm*—Oblon, Spivak, McClelland, Maier & Neustadt, P.C.

(57) ABSTRACT

According to one aspect of this invention, there is provided a transmitting and receiving device including a transmitting device having a pulse width modulation encoder which generates a pulse width signal having a pulse width corresponding to the binary digital signals outputted from the plurality of sigma-delta analog-to-digital conversion units, and a light-emitting element drive unit which generates and transmits an optical signal by causing a light-emitting element to emit light on the basis of the pulse width signal, and a receiving device having an optical reception unit which converts a current signal, obtained by receiving the optical signal by a light-receiving element, into the pulse width signal, and a pulse width demodulation decoder which reconstructs the binary digital signals of a plurality of channels on the basis of the pulse width signal.

20 Claims, 5 Drawing Sheets

US 7,304,594 B2

TRANSMITTING AND RECEIVING DEVICE AND TRANSMITTING DEVICE AND RECEIVING DEVICE

CROSS REFERENCE TO RELATED APPLICATIONS

This application is based upon and claims the benefit of priority from the prior Japanese Patent Application No. 2005-288735, filed on Sep. 30, 2005, the entire contents of which are incorporated herein by reference.

BACKGROUND

There is available a linear transmission photocoupler having a transmitting device which generates an optical signal corresponding to an input analog signal and transmits the optical signal and a receiving device which receives the optical signal transmitted from the transmitting device and reconstruct the original analog signal.

To transmit a plurality of analog signals using linear transmission photocouplers of this type, the number of linear transmission photocouplers prepared needs to be equal to that of analog signals to be transmitted. In this case, the circuit scale becomes large, and the power consumption increases.

SUMMARY

A transmitting and receiving device according to an aspect of the present invention includes a transmission device having a plurality of sigma-delta analog-to-digital conversion units, provided corresponding in number to channels of input analog signals, which generate binary digital signals by performing sigma-delta analog-to-digital conversion for the analog signals, a pulse width modulation encoder which generates a pulse width signal having a pulse width corresponding to the binary digital signals outputted from the plurality of sigma-delta analog-to-digital conversion units, and a light-emitting drive unit which generates and transmits an optical signal by causing a light-emitting element to emit light on the basis of the pulse width signal, and a receiving device having an optical reception unit which converts a current signal, obtained by receiving the optical signal by a light-receiving element, into the pulse width signal, a pulse width demodulation decoder which reconstructs the binary digital signals of a plurality of channels on the basis of the pulse width signal, and a plurality of 1-bit digital-to-analog conversion units, provided corresponding in number to the channels of the binary digital signals, which reconstruct the analog signals by performing 1-bit digital-to-analog conversion for the input binary digital signals.

DETAILED DESCRIPTION OF THE INVENTION

An embodiment of the present invention will be explained below with reference to the drawings.

Figure 1:
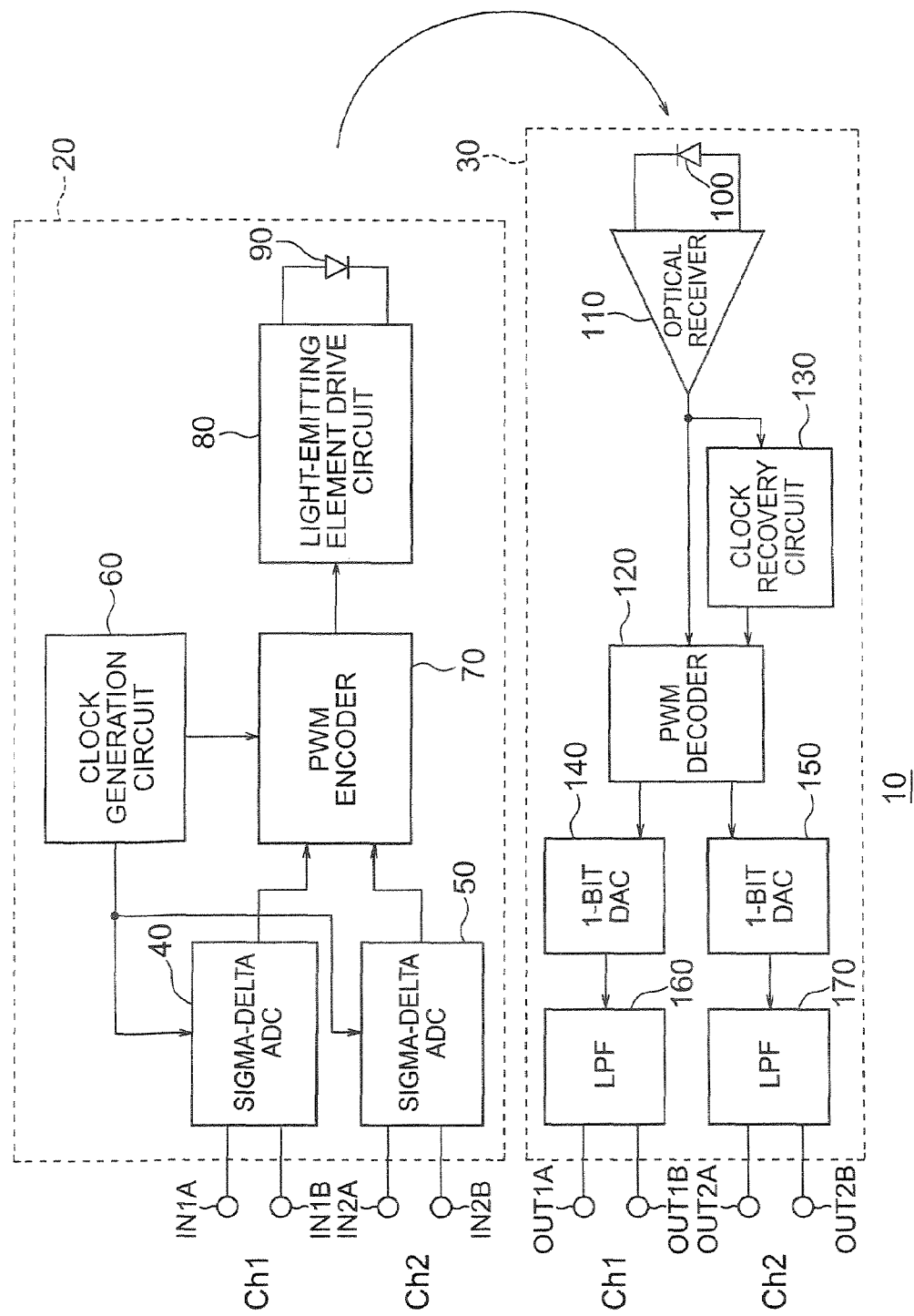
FIG. 1 is a block diagram of a transmitting and receiving device according to an embodiment.

FIG. 1 shows the configuration of a linear transmission photocoupler 10 as a transmitting and receiving device according to the embodiment. The linear transmission photocoupler 10 has a transmitting device 20 which generates an optical signal corresponding to an analog signal inputted from outside and transmits the optical signal and a receiving device 30 which receives the optical signal transmitted from the transmitting device 20 and reconstructs the original analog signal.

Of analog signals of two channels supplied from outside, an analog signal of a channel Ch1 is input to a sigma-delta AD converter 40 via an input terminal IN1A and an analog signal of a channel Ch2 is input to a sigma-delta AD converter 50 via an input terminal IN2A. Note that input terminals IN1B and IN2B are connected to, e.g., ground, thereby supplying a reference potential to the sigma-delta AD converters 40 and 50. Instead of connecting the input terminals IN1B and IN2B to ground, differential signals may be respectively applied to the input terminals IN1A and IN1B and to the input terminals IN2A and IN2B.

The sigma-delta ($\Sigma\Delta$) AD converter 40 performs 1-bit AD conversion called sigma-delta AD conversion for an analog signal of the channel Ch1 on the basis of a clock signal supplied from a clock generation circuit 60. With this operation, the sigma-delta AD converter 40 generates a binary digital signal corresponding to the analog signal and outputs the binary digital signal to a PWM encoder 70.

For example, assume that an input analog signal has a sinusoidal waveform. At a time when the voltage level of the analog signal is in the neighborhood of a value intermediate between the maximum value and the minimum value, data "1" ("H" level) occurs with a probability of about 50%. The probability of occurrence of data "1" increases with an increase in voltage level. Data "1" occurs with a probability of about 100% when the voltage level is in the neighborhood of the maximum value. In contrast, the probability of occurrence of data "0" increases with a reduction in the voltage level of the analog signal. Data "0" occurs with a probability of about 100% when the voltage level is in the neighborhood of the minimum value.

As described above, a binary digital signal is generated such that the pulse density is high at a time when the voltage level of the original analog signal is in the neighborhood of the maximum value and is low at a time when the voltage level is in the neighborhood of the minimum value.

Similarly, the sigma-delta AD converter 50 performs sigma-delta AD conversion for an analog signal of the channel Ch2 on the basis of the clock signal. With this operation, the sigma-delta AD converter 50 generates a binary digital signal corresponding to the analog signal and outputs the binary digital signal to the PWM encoder 70.

At a time when the voltage level of an input analog signal is in the neighborhood of a value intermediate between the maximum value and the minimum value, data "1" needs to occur with a probability of 50%. However, if an integrator (not shown) included in each of the sigma-delta AD converters 40 and 50 has an offset, data "1" does not occur with a probability of 50%.

If an auto-zero integrator is used as an integrator, an offset can be reduced. This makes it possible to cause data "1" to occur with a probability of about 50% at a time when the voltage level of an analog signal is in the neighborhood of a value intermediate between the maximum value and the minimum value.

The PWM (pulse width modulation) encoder 70 generates a pulse width signal having a pulse width corresponding to the combination of binary digital signals supplied from the sigma-delta AD converters 40 and 50 in sync with the clock signal supplied from the clock generation circuit 60 and outputs the pulse width signal with clock information on its rising edges to a light-emitting element drive circuit 80.

Figure 2:
FIG. 2 is an explanatory chart showing the relationship between binary digital signals and a pulse width signal.

In other words, the PWM encoder 70 selects a desired one of four (=$2^2$) pulse width signals having different pulse widths depending on the combination of the binary digital signal of the channel Ch1 and that of the channel Ch2 and outputs the pulse width signal, as shown in FIG. 2.

If the combination of the binary digital signals of the channels Ch1 and Ch2 is (0, 0), the PWM encoder 70 outputs a pulse width signal having a pulse width corresponding to one cycle of the clock signal. If the combination is (1, 0), the PWM encoder 70 outputs a pulse width signal having a pulse width corresponding to two cycles of the clock signal. If the combination is (0, 1), the PWM encoder 70 outputs a pulse width signal having a pulse width corresponding to three cycles of the clock signal. If the combination is (1, 1), the PWM encoder 70 outputs a pulse width signal having a pulse width corresponding to four cycles of the clock signal.

Figure 3:
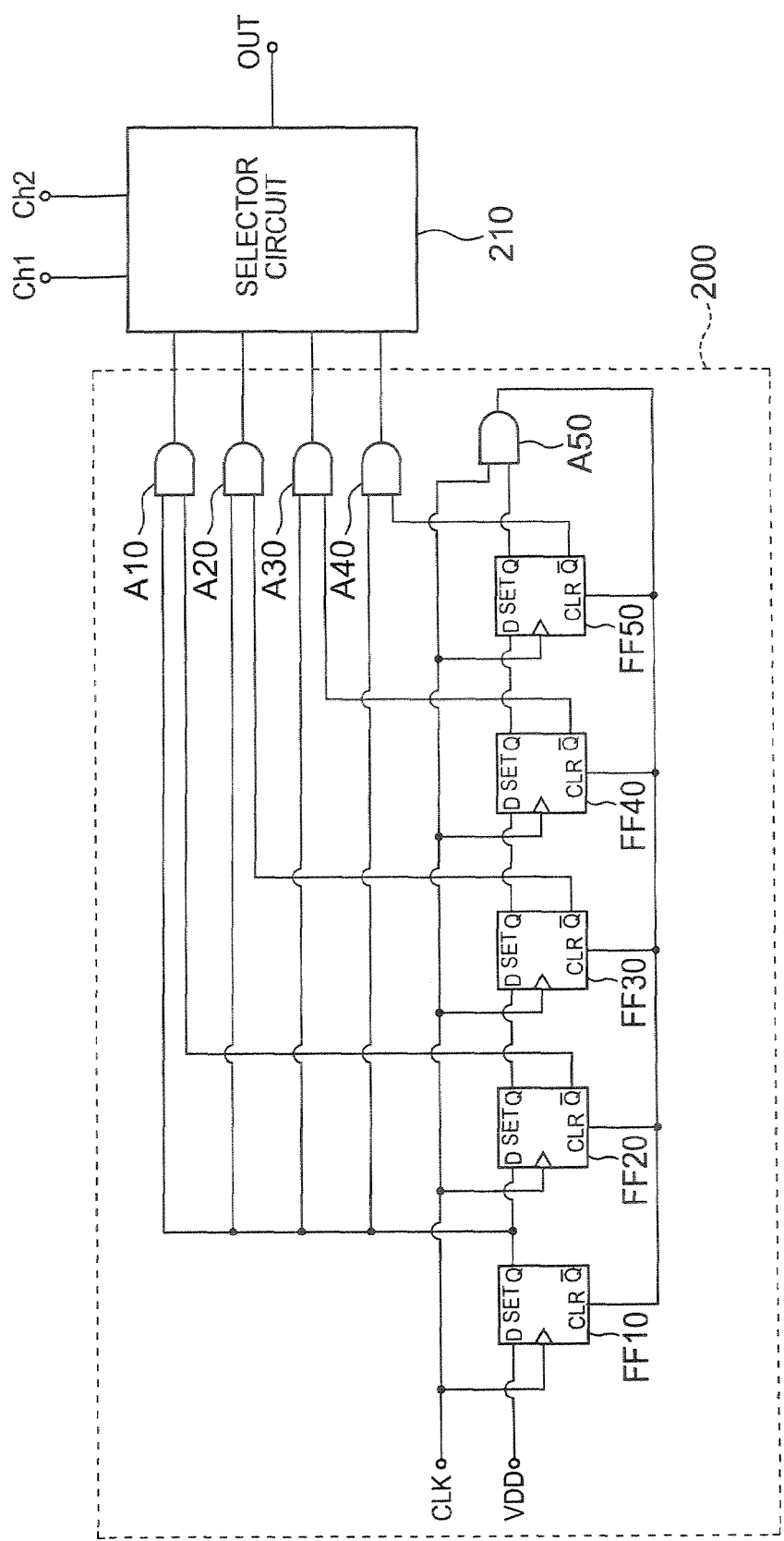
FIG. 3 is a circuit diagram of a PWM encoder.

FIG. 3 shows a configuration of the PWM encoder 70. The PWM encoder 70 has a pulse width signal generator 200 which generates four pulse width signals having different pulse widths and a selector circuit 210. The selector circuit 210 selects a desired one of the four pulse width signals supplied from the pulse width signal generator 200 depending on the combination of the binary digital signals of the channels Ch1 and Ch2 and outputs the pulse width signal.

The pulse width signal generator 200 has a configuration obtained by series-connecting 5-stage ($5=2^2+1$) D-type flip-flops FF10 to FF50.

A signal of "H" level (potential VDD) is input to an input terminal D of the D-type flip-flop FF10 at a first stage. A signal output from an output terminal Q of each of the D-type flip-flops FF10 to FF50 changes from "H" level to "L" level at a time when a reset signal is input to a corresponding clear terminal CLR. After that, the signals change from "L" level to "H" level at different times which are successively delayed by a clock cycle on the basis of a supplied clock signal CLK.

A signal outputted from an inverted output terminal Q– of each of the D-type flip-flops FF20 to FF50 is generated by inverting the signal output from the outputted terminal Q.

AND circuits A10 to A40 calculate the logical products of the signal outputted from the output terminal Q of the D-type flip-flop FF10 at the first stage and the signals outputted from the inverted output terminals Q– of the D-type flip-flops FF20 to FF50 at second to fifth stages. With this operation, the AND circuits A10 to A40 generate respective pulse width signals having different pulse widths.

An AND circuit A50 which operates as a reset circuit calculates the logical product of the clock signal CLK and the signal outputted from the output terminal Q of the flip-flop FF50 at the fifth stage to generate the reset signal. The AND circuit A50 supplies the reset signal to the D-type flip-flops FF10 to FF50, thereby generating a pulse width signal with a cycle corresponding to five cycles of the clock signal.

The light-emitting element drive circuit 80 drives a light-emitting element 90 such as an LED on the basis of a pulse width signal supplied from the PWM encoder 70, thereby generating and transmitting an optical signal That is, the light-emitting element drive circuit 80 causes the light-emitting element 90 to emit light if the supplied pulse width signal is at "L" level and causes the light-emitting element 90 to stop emitting light if the pulse width signal is at "H" level.

Figure 4:
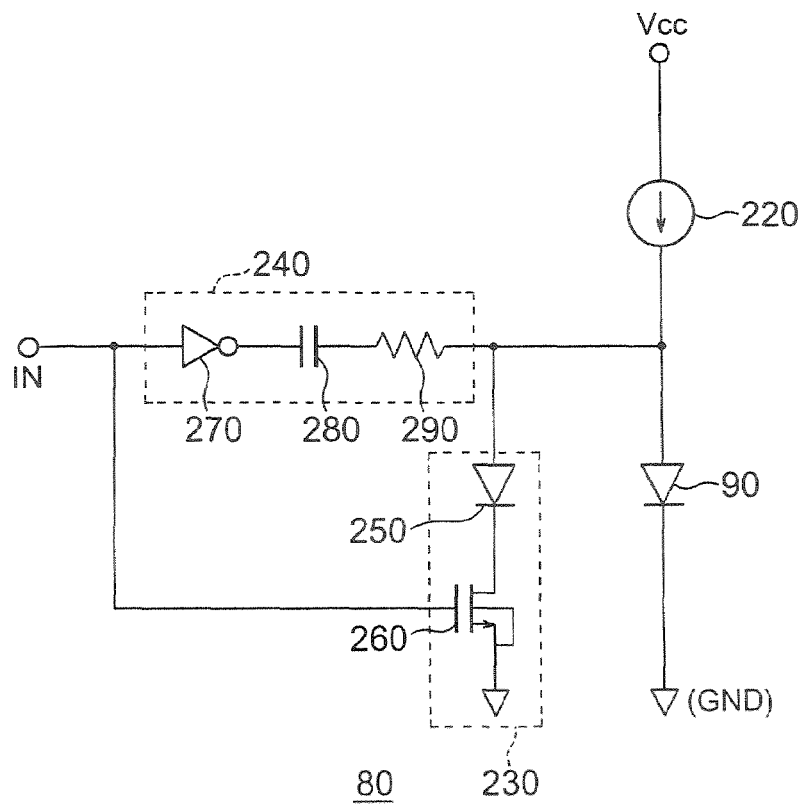
FIG. 4 is a circuit diagram of a light-emitting element drive circuit.

FIG. 4 shows a configuration of the light-emitting element drive circuit 80. The light-emitting element drive circuit 80 has a constant current source 220 as a current supply unit series-connected to the light-emitting element 90, and the constant current source 220 supplies a current to the light-emitting element 90.

The light-emitting element drive circuit 80 also has a switching circuit 230 for switching the state of the constant current source 220's supply of a current to the light-emitting element 90. The switching circuit 230 is connected to an anode of the light-emitting element 90 and composed of a series circuit of a diode 250 and an NMOS transistor 260. Note that the diode 250 is connected to the light-emitting element 90 such that a direction heading from the anode of the light-emitting element 90 to a cathode thereof becomes a forward direction.

As described above, the switching circuit 230 has a current path formed of the diode 250 and NMOS transistor 260. A voltage drop in the current path when the NMOS transistor 260 is brought into a conducting state (ON state) is set to be smaller than a forward voltage when the light-emitting element 90 is emitting light.

When a pulse width signal supplied from the PWM encoder 70 changes from "H" level to "L" level, and the NMOS transistor 260 is brought into a non-conducting state, a current from the constant current source 220 flows toward the light-emitting element 90. This causes the light-emitting element 90 to emit light.

Assume that in this state, the pulse width signal changes from "L" level to "H" level and that the NMOS transistor 260 is brought into the conducting state. Since the voltage drop in the current path formed of the switching circuit 230 is smaller than the forward voltage when the light-emitting element 90 is emitting light, the current from the constant current source 220 flows toward the diode 250. This causes the light-emitting element 90 to stop emitting light.

The light-emitting element drive circuit 80 further has a peaking circuit 240 composed of a series circuit of an inverter 270, a capacitor 280, and a resistor 290 between an input terminal IN and the anode of the light-emitting element 90.

Assume that in the peaking circuit 240, the supplied pulse width signal changes from "H" level to "L" level and that the NMOS transistor 260 is brought into the non-conducting state. Since the level of the pulse width signal is inverted from "L" level to "H" level by the inverter 270, charge stored in the capacitor 280 is discharged toward the anode of the light-emitting element 90.

Because of this, a peaking current flows in the forward direction of the light-emitting element 90 for a predetermined period of time and is superimposed on the current from the constant current source 220.

Assume that in the peaking circuit 240, the supplied pulse width signal changes from "L" level to "H" level and that the NMOS transistor 260 is brought into the conducting state. Since the level of the pulse width signal is inverted from "H" level to "L" level by the inverter 270, internal charge stored in a capacitance of the light-emitting element 90 and the current from the constant current source 220 are drawn into the capacitor 280.

Because of this, the peaking current flows in a direction opposite to the forward direction of the light-emitting element 90 for a predetermined period of time, and the current drawing rate becomes faster.

As described above, switching of the light-emitting element 90 from a non-light emission state to a light emission state and switching from the light emission state to the non-light emission state are performed at high speed, and the signal waveform of an optical signal generated by the light-emitting element 90 is shaped into that of a rectangular wave. This makes it possible to reduce pulse width distortion and perform correct signal transmission in the linear transmission photocoupler 10.

Note that the resistor 290 of the peaking circuit 240 is unnecessary depending on the driving capability of the inverter 270 or the characteristics of the light-emitting element 90. If the light-emitting element 90 operates at high speed, and no pulse width distortion occurs, there is also available the option of not providing the peaking circuit 240.

It is also possible to insert an inverter between the PWM encoder 70 and the light-emitting element drive circuit 80 and cause the light-emitting element 90 to emit light when the pulse width signal supplied from the PWM encoder 70 is at "H" level. At this time, a pulse width signal outputted from an optical receiver 110 (to be described later) also needs to be inverted.

Referring back to FIG. 1, the receiving device 30 receives an optical signal transmitted from the transmitting device 20 with a light-receiving element 100. The light-receiving element 100 generates a current signal corresponding to the optical signal and outputs the current signal to the optical receiver 110. The optical receiver 110 converts the current signal into a pulse width signal, thereby reconstructing the signal outputted from the PWM encoder 70. The optical receiver 110 outputs the reconstructed signal to a PWM decoder 120 and a clock recovery circuit 130.

Figure 5:
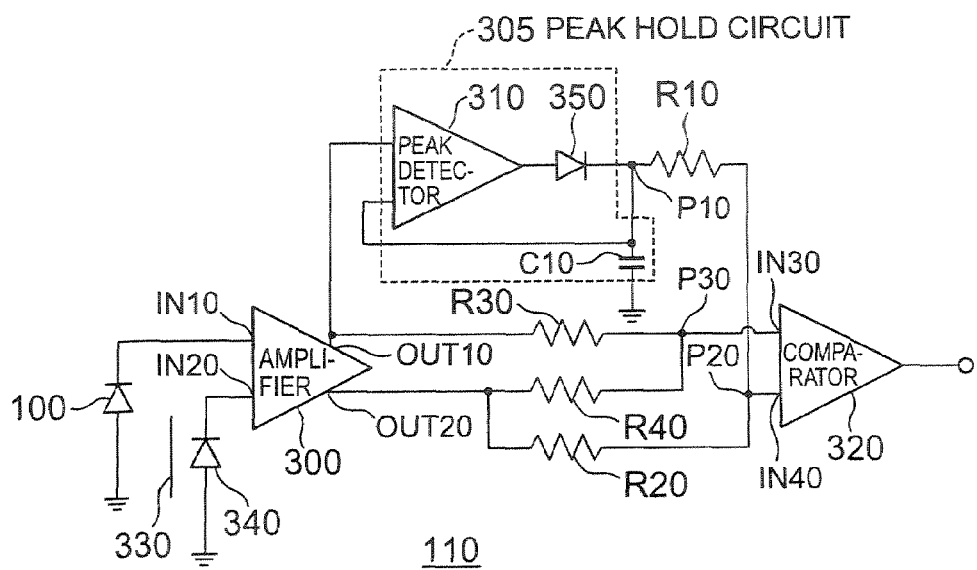
FIG. 5 is a circuit diagram of an optical receiver.
Figure 6:
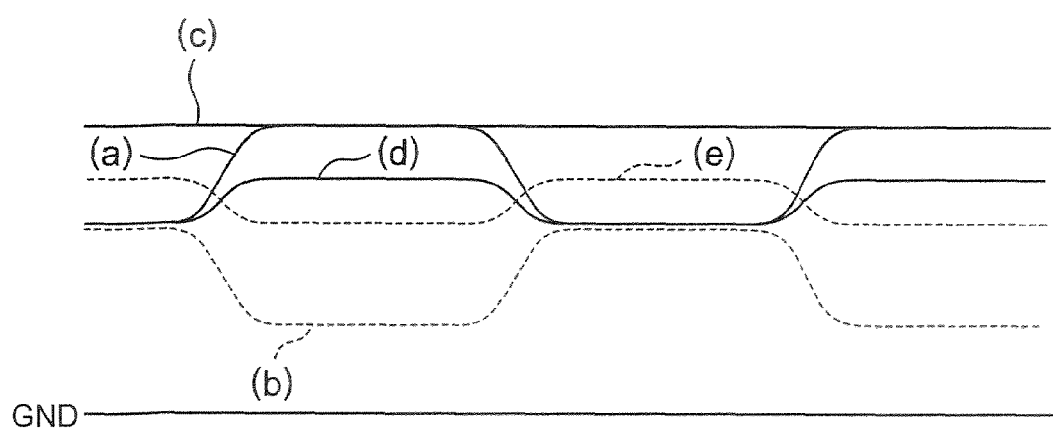
FIG. 6 shows the signal waveforms of signals obtained in the optical receiver.

FIG. 5 shows a configuration of the optical receiver 110. FIG. 6 shows the signal waveforms of signals obtained in the optical receiver 110. A current signal obtained by the light-receiving element 100 is input to a first input end IN10 of an amplifier 300 and a current signal obtained by a dummy light-receiving element 340, for which a shading unit 330 is arranged to prevent the dummy light-receiving element 340 from receiving an optical signal, is input to a second input end IN20 of the amplifier 300.

The amplifier 300 amplifies a voltage difference between a voltage corresponding to the current signal inputted from the first input end IN10 and a voltage corresponding to the current signal inputted from the second input end IN20. The amplifier 300 outputs an obtained positive-phase voltage signal (a) from a first output end OUT10 and outputs a negative-phase voltage signal (b) from a second output end OUT20.

A peak hold circuit 305 has a peak detector 310, a diode 350, and a capacitor C10. The peak hold circuit 305 detects and holds a peak voltage of the positive-phase voltage signal (a) outputted from the first output end OUT10 of the amplifier 300. With this operation, the peak hold circuit 305 generates a peak voltage signal (c) with the peak voltage of the positive-phase voltage signal (a) at a junction point P10 of a cathode of the diode 350 serving as the output side of the peak hold circuit 305 and a resistor R10.

A series circuit of the resistor R10 and a resistor R20 is connected between the output side of the peak hold circuit 305 and the second output end OUT20 of the amplifier 300, and the resistance values of the resistors R10 and R20 are selected such that they have a ratio of 1:1. In this case, a voltage signal (e) obtained by internally dividing in a ratio of 1:1 (multiplying by ½) a difference between the voltages of the peak voltage signal (c) and negative-phase voltage signal (b) is generated at a junction point P20 of the resistors R10 and R20. The voltage signal (e) is input to a second input end IN40 of a comparator 320.

A series circuit of resistors R30 and R40 is connected between the first output end OUT10 and the second output end OUT20 of the amplifier 300. The resistance values of the resistors R30 and R40 are selected such that they have a ratio of 1:3. In this case, a voltage signal (d) obtained by internally dividing in a ratio of 1:3 (multiplying by ¾) a difference between the voltages of the positive-phase voltage signal (a) and the negative-phase voltage signal (b) is generated at a junction point P30 of the resistors R30 and R40. The voltage signal (d) is input to a first input end IN30 of the comparator 320.

The comparator 320 compares the voltage signal (d) inputted from the first input end IN30 with the voltage signal (e) inputted from the second input end IN40. With this operation, the comparator 320 reconstructs a pulse width signal corresponding to a signal outputted from the PWM encoder 70 and outputs the pulse width signal to the PWM decoder 120 and clock recovery circuit 130.

In this case, the voltage signal (d) inputted from the first input end IN30 and the voltage signal (e) inputted from the second input end IN40 are equal in amplitude, and the waveforms of the signals cross each other in the neighborhood of the centers of their amplitudes. For this reason, even if transmitted optical signals vary in strength, a pulse width signal with a correct pulse width corresponding to each of the optical signals can be generated. Accordingly, correct signal transmission can be performed in the linear transmission photocoupler 10.

The clock recovery circuit 130 is composed of a delay-locked loop, phase-locked loop, or the like. The clock recovery circuit 130 reproduces a clock signal on the basis of an input pulse width signal and outputs the clock signal to the PWM decoder 120.

The PWM decoder 120 reconstructs binary digital signals of the channels Ch1 and Ch2 on the basis of the supplied clock signal and pulse width signal and outputs the binary digital signal of the channel Ch1 to a 1-bit DA converter 140 and outputs the binary digital signal of the channel Ch2 to a 1-bit DA converter 150.

The 1-bit DA converter 140 performs 1-bit DA conversion for the binary digital signal of the channel Ch1. With this operation, the 1-bit DA converter 140 generates an analog signal of the channel Ch1 and outputs the analog signal to a low-pass filter (LPF) 160.

The low-pass filter 160 reconstructs an original analog signal of the channel Ch1 by removing noise from the analog signal of the channel Ch1 and outputs the original analog signal from an output terminal OUT1A.

Similarly, an original analog signal of the channel Ch2 is reconstructed from the binary digital signal of the channel Ch2 by the 1-bit DA converter 150 and a low-pass filter 170. After that, the original analog signal is outputted from an output terminal OUT2A.

Note that the low-pass filters 160 and 170 each include an active filter. If a chopper amplifier which operates in accordance with a reproduced clock signal is used as an amplifier included in the active filter, an offset can be reduced.

As described above, according to this embodiment, analog signals of two channels can be transmitted by one transmission means (i.e., a set of a light-emitting element 90 and a light-receiving element 100). This makes it possible to reduce the circuit scale and reduce power consumption Note that the above-described embodiment is merely an example and not intended to limit the present invention. For example, it is also possible to transmit analog signals of equal to or more than three channels by one transmission means.

What is claimed is:

1. A transmitting and receiving device comprising:
   a transmitting device having
   a plurality of sigma-delta analog-to-digital conversion units, provided corresponding in number to channels of input analog signals, which generate binary digital signals by performing sigma-delta analog-to-digital conversion for the analog signals,
   a pulse width modulation encoder which generates a pulse width signal having a pulse width corresponding to the binary digital signals outputted from the plurality of sigma-delta analog-to-digital conversion units, and
   a light-emitting element drive unit which generates and transmits an optical signal by causing a light-emitting element to emit light on the basis of the pulse width signal; and
   a receiving device having
   an optical reception unit which converts a current signal, obtained by receiving the optical signal by a light-receiving element, into the pulse width signal,
   a pulse width demodulation decoder which reconstructs the binary digital signals of a plurality of channels on the basis of the pulse width signal, and
   a plurality of 1-bit digital-to-analog conversion units, provided corresponding in number to the channels of the binary digital signals, which reconstruct the analog signals by performing 1-bit digital-to-analog conversion for the input binary digital signals.

2. The transmitting and receiving device according to claim 1, wherein the pulse width modulation encoder comprises
   a pulse width signal generator having
   a ($2^N$+1)-stage flip-flop obtained by series-connecting $2^N$+1 flip-flops, where N is the number of channels, and
   $2^N$ AND circuits which generate $2^N$ types of pulse width signals with different pulse widths, each being the pulse width signal, by calculating a logical product of an output of the flip-flop at a first stage and each of inverted outputs of the flip-flops at second to last stages, and
   a selection circuit which selects and outputs a desired one of the $2^N$ types of pulse width signals in accordance with the binary digital signals outputted from the plurality of sigma-delta analog-to-digital conversion units.

3. The transmitting and receiving device according to claim 1, wherein the light-emitting element drive unit comprises
   a current supply unit which is series-connected to the light-emitting element and supplies a current to the light-emitting element and
   a switching unit which switches a state of supply of a current to the light-emitting element by the current supply unit,
   the switching unit has
   a diode connected to an anode of the light-emitting element such that a direction heading from the anode of the light-emitting element to a cathode becomes a forward direction and
   a switching element which is series-connected to the diode and switches a connection state on the basis of the pulse width signal, and
   a voltage drop in a current path formed of the diode and switching element when the switching element is brought into a conducting state is selected to be smaller than a forward voltage when the light-emitting element is emitting light.

4. The transmitting and receiving device according to claim 3, wherein the light-emitting element drive unit further comprises
   a peaking unit which supplies a peaking current in the forward direction of the light-emitting element if the switching element is brought into a non-conducting state and supplies a peaking current in a direction opposite to the forward direction of the light-emitting element if the switching element is brought into the conducting state.

5. The transmitting and receiving device according to claim 4, wherein the peaking unit is connected to the anode of the light-emitting element and composed of a series circuit of an inverter, a capacitor, and a resistor.

6. The transmitting and receiving device according to claim 1, wherein each of the sigma-delta analog-to-digital conversion units has an auto-zero integrator as an integrator.

7. The transmitting and receiving device according to claim 1, wherein the optical reception unit comprises
   an amplifier which generates a positive-phase voltage signal and a negative-phase voltage signal on the basis of a current signal obtained by the light-receiving element and outputs the signals,
   a peak hold circuit which generates a peak voltage signal by detecting and holding a peak voltage of the positive-phase voltage signal,
   a group of resistive elements which generates first and second voltage signals that are equal in amplitude and whose waveforms cross each other in the neighborhood of centers of amplitudes of the first and second voltage signals on the basis of the positive-phase voltage signal, negative-phase voltage signal, and peak voltage signal, and
   a comparator which generates the pulse width signal by comparing the first and second voltage signals.

8. The transmitting and receiving device according to claim 7, wherein the peak hold circuit has a peak detector, a diode, and a capacitor.

9. The transmitting and receiving device according to claim 7, wherein the group of resistive elements is formed by
   a first resistor connected between an output end of the peak hold circuit and a second input end of the comparator,
   a second resistor connected between a second output end of the amplifier and the second input end of the comparator,
   a third resistor connected between a first output end of the amplifier and a first input end of the comparator, and
   a fourth resistor connected between the second output end of the amplifier and the first input end of the comparator, and
   resistance values of the first and second resistors are selected such that the resistance values have a ratio of 1:1, and resistance values of the third and fourth resistors are selected such that the resistance values have a ratio of 1:3.

10. The transmitting and receiving device according to claim 1, further comprising a plurality of low-pass filters respectively connected to subsequent stages of the plurality of 1-bit digital-to-analog conversion units, wherein each of the low-pass filters includes an active filter, and a chopper amplifier which operates in accordance with a reproduced clock signal is used as an amplifier of the active filter.

11. A transmitting device comprising:

a plurality of sigma-delta analog-to-digital conversion units, provided corresponding in number to channels of input analog signals, which generate binary digital signals by performing sigma-delta analog-to-digital conversion for the analog signals;

a pulse width modulation encoder which generates a pulse width signal having a pulse width corresponding to the binary digital signals output from the plurality of sigma-delta analog-to-digital conversion units; and a light-emitting element drive unit which generates and transmits an optical signal by causing a light-emitting element to emit light on the basis of the pulse width signal.

12. The transmitting device according to claim 11, wherein the pulse width modulation encoder comprises a pulse width signal generator having a ($2^N+1$)-stage flip-flop obtained by series-connecting $2^N+1$ flip-flops, where N is the number of channels, and $2^N$ AND circuits which generate $2^N$ types of pulse width signals with different pulse widths, each being the pulse width signal, by calculating a logical product of an output of the flip-flop at a first stage and each of inverted outputs of the flip-flops at second to last stages; and a selection circuit which selects and outputs a desired one of the $2^N$ types of pulse width signals in accordance with the binary digital signals output from the plurality of sigma-delta analog-to-digital conversion units.

13. The transmitting device according to claim 11, wherein the light-emitting element drive unit comprises a current supply unit which is series-connected to the light-emitting element and supplies a current to the light-emitting element and a switching unit which switches a state of supply of a current to the light-emitting element by the current supply unit, the switching unit has a diode connected to an anode of the light-emitting element such that a direction heading from the anode of the light-emitting element to a cathode becomes a forward direction and a switching element which is series-connected to the diode and switches a connection state on the basis of the pulse width signal, and a voltage drop in a current path formed of the diode and switching element when the switching element is brought into a conducting state is selected to be smaller than a forward voltage when the light-emitting element is emitting light.

14. The transmitting device according to claim 13, wherein the light-emitting element drive unit further comprises a peaking unit which supplies a peaking current in the forward direction of the light-emitting element if the switching element is brought into a non-conducting state and supplies a peaking current in a direction opposite to the forward direction of the light-emitting element if the switching element is brought into the conducting state.

15. The transmitting device according to claim 14, wherein the peaking unit is connected to the anode of the light-emitting element and composed of a series circuit of an inverter, a capacitor, and a resistor.

16. The transmitting device according to claim 11, wherein each of the sigma-delta analog-to-digital conversion units has an auto-zero integrator as an integrator.

17. A receiving device comprising:

an optical reception unit which converts a current signal, obtained by receiving an optical signal by a light-receiving element, into a pulse width signal;

a pulse width demodulation decoder which reconstructs binary digital signals of a plurality of channels on the basis of the pulse width signal; and a plurality of 1-bit digital-to-analog conversion units, provided corresponding in number to the channels of the binary digital signals, which reconstruct analog signals by performing 1-bit digital-to-analog conversion for the input binary digital signals.

18. The receiving device according to claim 17, wherein the optical reception unit comprises an amplifier which generates a positive-phase voltage signal and a negative-phase voltage signal on the basis of a current signal obtained by the light-receiving element and outputs the signals, a peak hold circuit which generates a peak voltage signal by detecting and holding a peak voltage of the positive-phase voltage signal, a group of resistive elements which generates first and second voltage signals that are equal in amplitude and whose waveforms cross each other in the neighborhood of centers of amplitudes of the first and second voltage signals on the basis of the positive-phase voltage signal, negative-phase voltage signal, and peak voltage signal, and a comparator which generates the pulse width signal by comparing the first and second voltage signals.

19. The receiving device according to claim 18, wherein the peak hold circuit has a peak detector, a diode, and a capacitor.

20. The receiving device according to claim 18, wherein the group of resistive elements is formed by a first resistor connected between an output end of the peak hold circuit and a second input end of the comparator, a second resistor connected between a second output end of the amplifier and the second input end of the comparator, a third resistor connected between a first output end of the amplifier and a first input end of the comparator, and a fourth resistor connected between the second output end of the amplifier and the first input end of the comparator, and resistance values of the first and second resistors are selected such that the resistance values have a ratio of 1:1, and resistance values of the third and fourth resistors are selected such that the resistance values have a ratio of 1:3.

* * * * *